No. 788,393. PATENTED APR. 25, 1905.
H. DINGMAN.
COMBINED POTATO CUTTER AND PLANTER.
APPLICATION FILED NOV. 7, 1904.

Witnesses
Inventor
Harry Dingman,
By Victor J. Evans
Attorney

No. 788,393. Patented April 25, 1905.

UNITED STATES PATENT OFFICE.

HARRY DINGMAN, OF KIMBALL, MINNESOTA, ASSIGNOR OF ONE-HALF TO WALTER DIXON, OF KIMBALL, MINNESOTA.

COMBINED POTATO CUTTER AND PLANTER.

SPECIFICATION forming part of Letters Patent No. 788,393, dated April 25, 1905.

Application filed November 7, 1904. Serial No. 231,725.

*To all whom it may concern:*

Be it known that I, HARRY DINGMAN, a citizen of the United States, residing at Kimball, in the county of Stearns and State of Minnesota, have invented new and useful Improvements in a Combined Potato Cutter and Planter, of which the following is a specification.

This invention relates to potato-planters.

The object of the invention is to cut potatoes into pieces and to plant said pieces in the ground at a single operation. This object is attained by means of the improved device hereinafter described and claimed.

Figure 1:
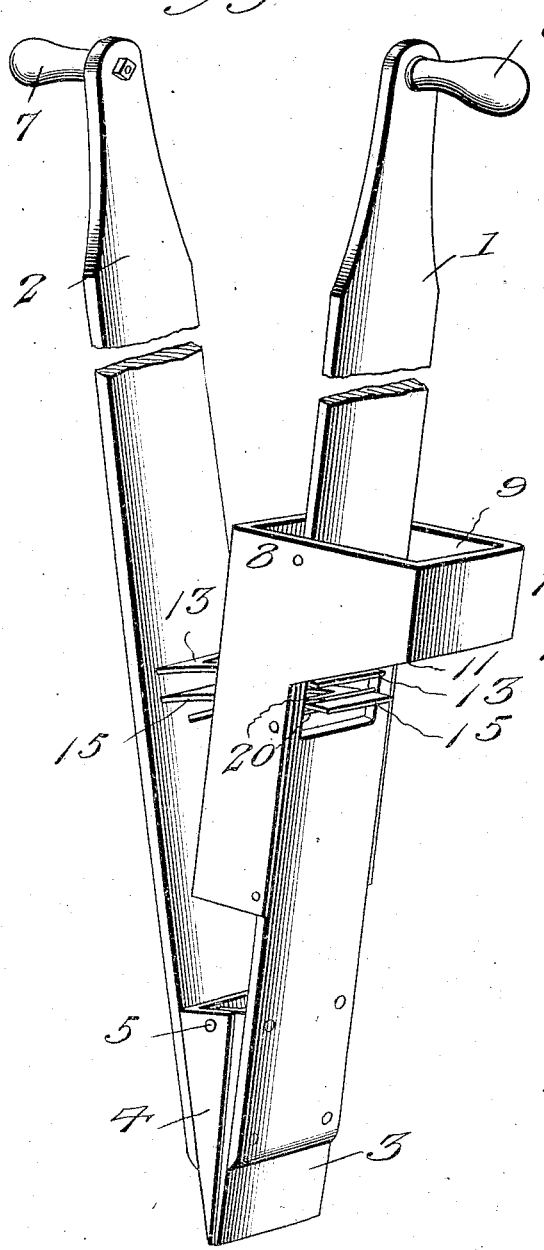
Figure 2:
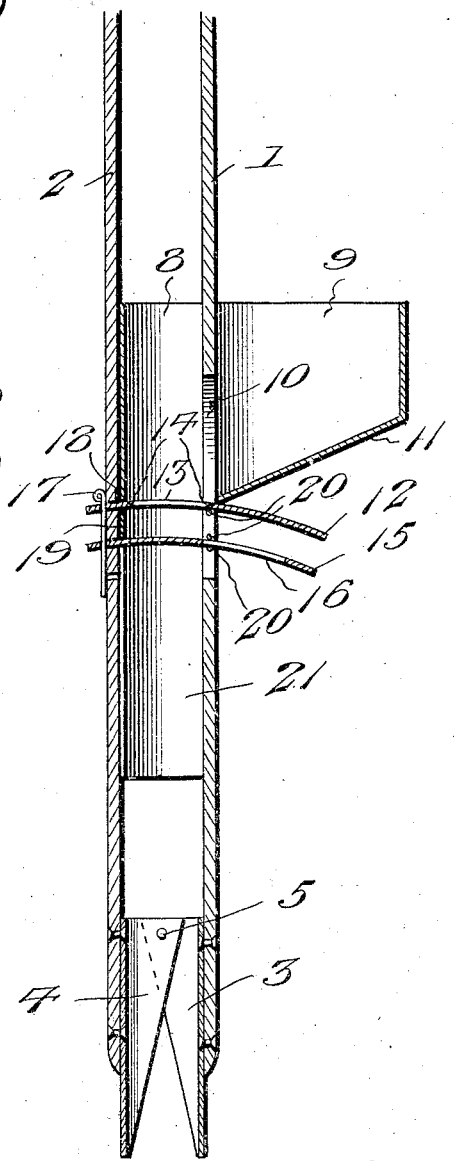

In the accompanying drawings, forming part of this specification, Figure 1 is a perspective view of a potato cutter and planter constructed in accordance with the present invention. Fig. 2 is a longitudinal section thereof.

Like reference-numerals indicate corresponding parts in the different views.

The numerals 1 and 2 indicate arms which are provided at their lower ends with suitable penetrating devices 3 and 4 and by means of which said arms are pivotally connected together, as indicated at 5. At their upper ends the arms 1 and 2 are provided with suitable handles 6 and 7, by means of which they can be operated. Connected with the arm 1 is a hopper 8, which, as shown in Fig. 2, is located between the two arms 1 and 2. The hopper 8 is provided with an extension 9, which serves to increase the holding capacity thereof. An opening 10 is formed in the arm 1 to permit communication between the extension 9 and the hopper 8. The extension 9 is formed with an inclined bottom 11, the function of which is to deflect potatoes contained in such extension through the opening 10 into the main portion 8 of the hopper.

Secured upon the arm 2 is a cutting-slide 12, which is provided with an opening 13, having sharpened edges 14. A second slide 15 is also secured to the arm 2. As the function of the second slide 15, which is provided with an opening 16 out of line with the opening 13, is to limit the extent to which a potato may drop through the opening 13 in the cutting-slide 12, said slide 15 will be termed hereinafter the "limiting-slide." The cutting and limiting slides 12 and 15 are removably secured to the arm 2 by means of a pin 17, which extends through suitable openings in said slides. The cutting-slide 12 extends through a suitable transverse slot 18 in the hopper 8, and the limiting-slide 15 extends beneath the lower end 19 of said hopper. The free ends of the slides 12 and 15 extend between parallel wires 20, disposed across the opening 10 in the arm 1, said wires serving to hold the slides in proper position.

The hopper 8 is formed, preferably, with downward extensions 21.

Constructed as above described, the operation of the improved device is as follows: The hopper 8 and extension 9 are filled with potatoes which are to be planted. When the arms 1 and 2 are in closed position, as shown in Fig. 2, a potato extends partially through the opening 13 in the cutting-slide 12, the limiting-slide 15 serving to prevent said potato from dropping entirely through the cutting-slide. By opening the arms 1 and 2 the cutting-slide 12 slices a piece from the potato, said piece dropping through the opening 16 in the limiting-slide 15 into the pocket formed by the penetrating devices 3 and 4 at the lower ends of the arms 1 and 2. While the device is in the position shown in Fig. 2 and a slice of potato is held in the pocket at the lower ends of said arms, as described, the penetrating devices 3 and 4 are inserted into the ground and the arms are forced closed, thus permitting the slice of potato to fall into the space in the ground formed for its reception. When the arms are opened in the operation of slicing a potato, the lower end 19 of the hopper 8 serves as a wiper to insure that said slice will fall through the opening 16 in the slide 15 when the arms 1 and 2 are completely opened.

Changes in the precise embodiment of invention illustrated and described may be made within the scope of the following claims without departing from the spirit of the invention or sacrificing any of its advantages.

Having thus described the invention, what is claimed is—

1. A combined potato cutter and planter comprising pivotally-connected arms, having penetrating devices at their lower ends, a hopper connected with one of said arms, and cutting and limiting slides connected with the other of said arms, and each having an opening therein.

2. A combined potato cutter and planter comprising pivotally-connected arms, having penetrating devices at their lower ends, a hopper connected with one of said arms and being disposed between the two arms, an extension connected with said hopper and surrounding the arm to which the hopper is connected, said arm being formed with an opening, and said extension being formed with a bottom inclined toward said opening, a cutting-slide removably connected with the other arm and extending through a slot in said hopper, said slide being provided with an opening, and a limiting-slide removably connected with the arm to which the cutting-slide is connected, said limiting-slide being disposed below the cutting-slide and being formed with an opening out of line with the opening in the first-mentioned slide.

In testimony whereof I affix my signature in presence of two witnesses.

HARRY DINGMAN.

Witnesses:
J. G. REEVES,
C. L. SPAULDING.